(12) United States Patent
Watanabe et al.

(10) Patent No.: US 11,603,146 B2
(45) Date of Patent: Mar. 14, 2023

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/369,653

(22) Filed: Jul. 7, 2021

(65) Prior Publication Data
US 2022/0033014 A1 Feb. 3, 2022

(30) Foreign Application Priority Data
Jul. 31, 2020 (JP) .............................. JP2020-129791

(51) Int. Cl.
*B62D 35/02* (2006.01)
*B62D 35/00* (2006.01)
*B60R 16/03* (2006.01)

(52) U.S. Cl.
CPC .............. *B62D 35/02* (2013.01); *B60R 16/03* (2013.01); *B62D 35/005* (2013.01)

(58) Field of Classification Search
CPC .... B62D 35/001; B62D 35/005; B62D 35/02; B62D 35/008
USPC .......................................... 296/180.1, 181.5
See application file for complete search history.

(56) References Cited

U.S. PATENT DOCUMENTS

| 8,631,889 | B2* | 1/2014 | Begleiter | B60T 5/00 180/68.1 |
| 11,254,374 | B2* | 2/2022 | Diehl | B60R 3/02 |
| 2007/0023238 | A1* | 2/2007 | Ramsay | B60T 5/00 188/4 R |
| 2010/0038001 | A1 | 2/2010 | Yamaguchi | |
| 2013/0233658 | A1* | 9/2013 | Carmassi | B62D 35/005 188/264 R |
| 2014/0175830 | A1* | 6/2014 | Hasegawa | B62D 35/00 296/180.1 |
| 2014/0339887 | A1 | 11/2014 | Chen | |
| 2016/0096560 | A1* | 4/2016 | Koremoto | B62D 35/00 296/180.1 |
| 2016/0176385 | A1* | 6/2016 | Wolf | F16D 65/847 296/208 |
| 2016/0272258 | A1* | 9/2016 | Gibson | B62D 37/02 |

(Continued)

FOREIGN PATENT DOCUMENTS

| DE | 102014018990 A1 * | 6/2016 | ................ B60T 5/00 |
| DE | 102016000953 A1 * | 8/2017 | .......... B62D 35/005 |
| JP | 2007-253929 A | 10/2007 | |

(Continued)

*Primary Examiner* — Jason S Daniels
(74) *Attorney, Agent, or Firm* — McGinn I.P. Law Group, PLLC.

(57) ABSTRACT

An airflow adjusting apparatus to be provided in a vehicle includes an airflow ejector. The vehicle includes a wheel and a wheel housing including a cavity. The cavity is opened downward and laterally outward of a vehicle body of the vehicle, and houses a portion of the wheel. The airflow ejector is provided, in the cavity, on a front side of the vehicle relative to the wheel. The airflow ejector is configured to eject an airflow that forms a turbulence boundary layer adjacent to a surface of the wheel on a vehicle-widthwise inner side.

5 Claims, 6 Drawing Sheets

(56) References Cited

U.S. PATENT DOCUMENTS

2019/0342985 A1* 11/2019 Dadheech ............ H05H 1/2406

FOREIGN PATENT DOCUMENTS

| JP | 2014-227168 A | 12/2014 |
| JP | 2015-009749 A | 1/2015 |
| JP | 2016-222152 A | 12/2016 |
| WO | WO 2008/114668 A1 | 9/2008 |

* cited by examiner

AIRFLOW ADJUSTING APPARATUS

CROSS-REFERENCE TO RELATED APPLICATIONS

This application claims priority from Japanese Patent Application No. 2020-129791 filed on Jul. 31, 2020, the entire contents of which are hereby incorporated by reference.

BACKGROUND

The disclosure relates to an airflow adjusting apparatus to be provided in a vehicle such as an automobile and configured to adjust airflows around wheels.

When a vehicle such as an automobile is traveling, relative winds, or so-called traveling winds, occur around a vehicle body of the vehicle. Relative winds are airflows caused by travel of an own vehicle.

Such relative winds may become a turbulent flow in some region around the vehicle body, to form a vortex flow. This constitutes a cause of aggravation of, for example, air resistance, operation stability, aerodynamic noise, or so-called wind noise, and aerodynamic vibration.

In particular, around a wheel and a wheel house that houses the wheel, a relative wind collides with the wheel or a nearby component and separates itself. This easily results in disturbance of airflows. Accordingly, proposals have been made for various techniques aimed at airflow adjustment around wheels.

There are some existing techniques regarding an airflow adjusting apparatus to be provided at or around a wheel of a vehicle. For example, Japanese Unexamined Patent Application Publication (JP-A) No. 2007-253929 describes an aerodynamic stabilizer configured to move between an airflow adjusting position and a retreating position. At the airflow adjusting position, the aerodynamic stabilizer protrudes inside a wheel house that houses a wheel. At the retreating position, the aerodynamic stabilizer avoids interference with the wheel.

JP-A No. 2015-9749 describes a fin configured to suppress ejection of an air flow from a wheel house. The fin is provided for suppression of air disturbance sideways of a vehicle body.

JP-A No. 2014-227168 describes a plurality of wheel blades provided on a disk of a vehicle wheel, to suppress air resistance and noise. Each of the wheel blades includes an airflow drawing part and an airflow assisting part that are arranged in front and rear.

International Publication No. WO2008/114668 describes a turbulence generating protrusion, to decrease a temperature of a side portion of a tire. The turbulence generating protrusion protrudes from a sidewall of the tire and extends radially of a wheel.

There are also existing techniques regarding an airflow adjusting apparatus including a device that generates an airflow. For example, JP-A No. 2016-222152 describes a plasma actuator provided on a lower surface of an undercover provided in an underneath of a vehicle body. The plasma actuator generates an air flow to be ejected to rear side of a vehicle.

SUMMARY

An aspect of the technology provides an airflow adjusting apparatus to be provided in a vehicle. The vehicle includes a wheel and a wheel housing including a cavity. The cavity is opened downward and laterally outward of a vehicle body of the vehicle, and houses a portion of the wheel. The airflow adjusting apparatus includes an airflow ejector. The airflow ejector is provided, in the cavity, on a front side of the vehicle relative to the wheel. The airflow ejector is configured to eject an airflow that forms a turbulence boundary layer adjacent to a surface of the wheel on a vehicle-widthwise inner side.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
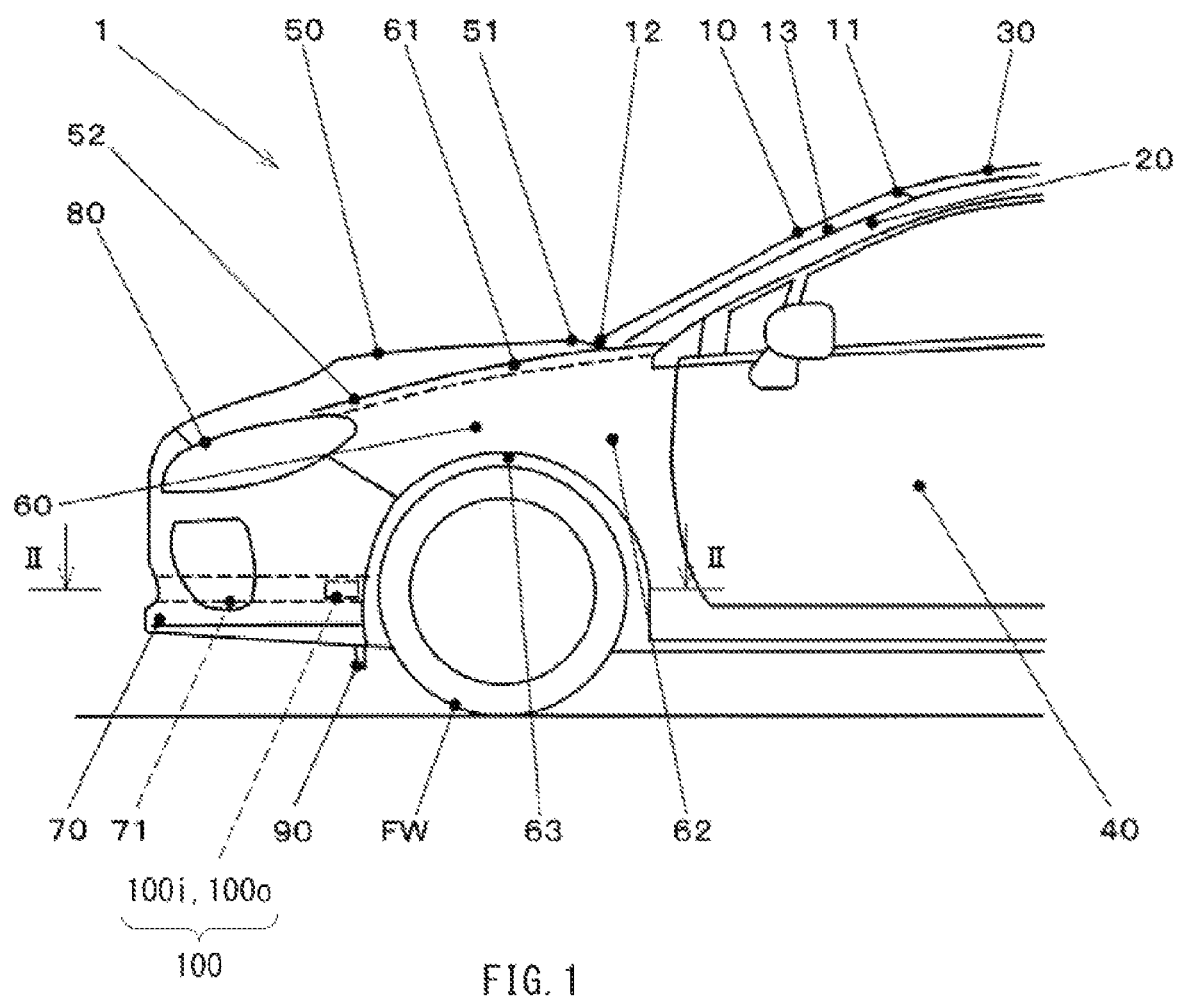
FIG. 1 is a schematic side view of a front portion of a vehicle body of a vehicle including an airflow adjusting apparatus according to a first embodiment of the disclosure.

When a vehicle is traveling, relative winds, or so-called traveling winds, flow in under a floor of the vehicle from front side of the own vehicle. Relative winds refer to airflows that move relative to a vehicle body in accompaniment with travel of the vehicle. Such relative winds collide with a wheel, typically a front wheel, or other component around the wheel, and separate themselves while causing turbulence. In particular, fragmental flows that have separated themselves vehicle-widthwise inward of a tire move along an inner side surface of the tire. Thereafter, some of the fragmental flows are discharged toward outer surface side of the vehicle.

Such fragmental flows toward the outer surface side of the vehicle may constitute a cause of aggravation of air resistance and operation stability.

It is desirable to provide an airflow adjusting apparatus that makes it possible to appropriately adjust fragmental flows caused by collision of relative winds with a wheel.

First Embodiment

Some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same reference characters to avoid redundant description, and elements not in direct relation to the technology may not be illustrated.

In the following, an airflow adjusting apparatus according to a first embodiment of the disclosure is described.

The airflow adjusting apparatus according to the first embodiment may be provided in, for example, an automobile, or a moving body. The automobile may be, for example, a passenger car of a so-called two-box or three-box vehicle shape that includes an engine room in front of a cabin.

FIG. 1 is a schematic side view of a front portion of a vehicle body of a vehicle including the airflow adjusting apparatus according to the first embodiment.

A vehicle 1 may include, without limitation, a windshield 10, a front pillar 20, a roof 30, a front door 40, a hood 50, a fender 60, a bumper face 70, a front combination lamp 80, and a flap 90.

The windshield 10 is a glass window provided in a front portion of the cabin.

The windshield 10 may have a substantially rectangular shape. The windshield 10 may be disposed in a backward tilted attitude, with an upper end 11 positioned on rear side of the vehicle relative to a lower end 12.

A side end 13 of the windshield 10 may be disposed along the front pillar 20.

The windshield 10 may include laminated glass of a quadric surface, and be curved or rounded to protrude toward front side of the vehicle.

The front pillar 20, or an A pillar, is a vehicle body structural member that extends along the side end 13 of the windshield 10.

A back end of the front pillar 20 may be disposed in adjacency to a sash provided around a front glass door in an upper portion of the front door 40.

The roof 30 is a panel that constitutes an upper surface of the cabin.

The roof 30 may extend, from the upper end 11 of the windshield 10, toward the rear side of the vehicle.

The front door 40 may be an openable and closeable door provided in a side surface of the front portion of the cabin.

The front door 40 may open or close by pivoting around an unillustrated hinge provided at a front end of the front door 40.

The hood 50 is an exterior member provided over an upper portion of the engine room. The hood 50 may be a lid-shaped body of an open and close type.

A rear edge 51 of the hood 50 may be disposed in front of the lower end 12 of the windshield 10, in spaced relation from the lower end 12 in a vehicle longitudinal direction.

A side edge 52 of the hood 50 may be disposed in adjacency to a vehicle-widthwise inner edge of an upper surface 61 of the fender 60, with a gap in between. The gap is unavoidably provided.

The fender 60 is an exterior member of the vehicle that constitutes, for example, a side surface of the engine room.

The fender 60 may include, without limitation, the upper surface 61 and a side surface 62.

The upper surface 61 is a region adjacent to a side end of the side edge 52 of the hood 50. The upper surface 61 may be formed to trace broadly a curved plane extending vehicle-widthwise outward from a curved plane of an outer surface of the hood 50.

The side surface 62 may extend downward from the vicinity of a vehicle-widthwise outer end of the upper surface 61.

Moreover, the side surface 62 may have an arcuate notch 63 of a wheel house H. The wheel house H is opened downward and laterally outward of the vehicle body, and houses a portion of a front wheel FW (see FIG. 2). In one embodiment of the disclosure, the wheel house H may serve as a "cavity".

The bumper face 70 is a resin-made exterior member provided in a lower portion of a front end of the vehicle.

The bumper face 70 may be provided in front of the arcuate notch 63 in the fender 60.

Inside a bumper face 70, a duct 71 may be provided. The duct 71 may include an inlet, or a front end 71A, provided in a front surface of the vehicle body. The duct 71 is configured to take a relative wind in through the inlet, or the front end 71A, and introduce the relative wind to inside the wheel house H. In one embodiment of the disclosure, the inlet, or the front end 71A, may serve as an "inlet".

Detailed configurations of the duct 71 is described later.

The front combination lamp 80 may include various lighting devices housed and unitized in a common housing. Non-limiting examples of the lighting devices may include a headlamp, a position lamp, and a turn signal lamp.

The front combination lamp 80 may be disposed on lower side of the hood 50 and on upper side of the bumper face 70 at the front end of the vehicle.

The flap 90 is a plate member protruded, in front of the front wheel FW, downward from an underside of the vehicle body.

The flap 90 may laterally separate a relative wind, or a traveling wind, flowing from forward of the vehicle toward under a floor of the vehicle, to make airflow adjustment and to suppress the relative wind from colliding with the front wheel FW.

Figure 2:
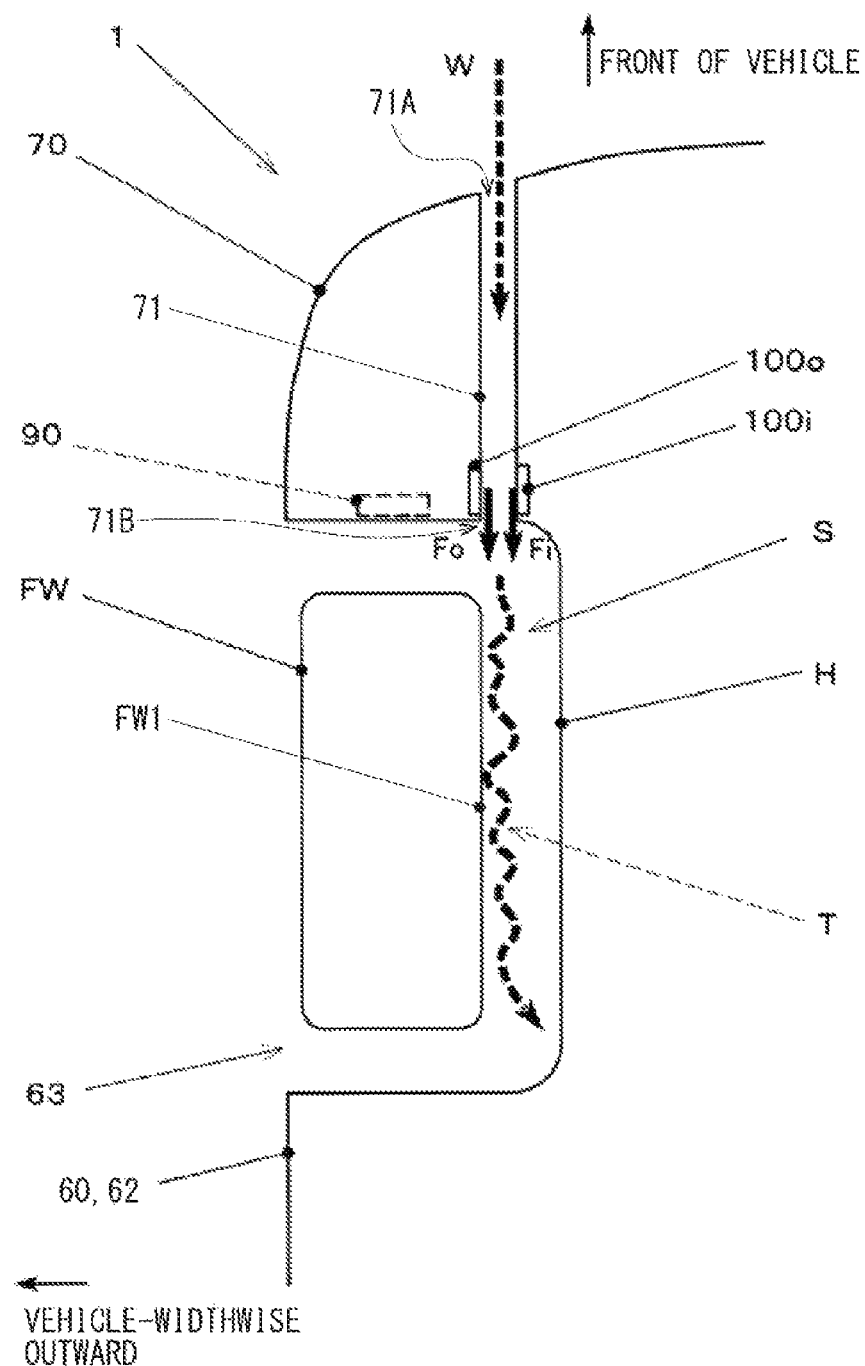
FIG. 2 is a schematic cross-sectional view taken along the line II-II of FIG. 1, looking in the direction of the arrows.

FIG. 2 is a schematic cross-sectional view taken along the line II-II of FIG. 1, looking in the direction of the arrows.

The duct 71 may extend along the vehicle longitudinal direction. The front end 71A of the duct 71 may be opened on the front side of the vehicle, in a front surface of the bumper face 70.

A rear end 71B of the duct 71 may be opened in an inner fender. The inner fender is a wall on the front side of the vehicle, of the wheel house H that houses the front wheel FW.

A vehicle-widthwise position of the rear end 71B of the duct 71 may be adjacent to a vehicle-widthwise inner side surface FW1 of the front wheel FW.

In one embodiment of the disclosure, the rear end 71B of the duct 71 may serve, in cooperation with plasma actuators 100o and 100i described later, as an "airflow ejector".

In one example, the rear end 71B of the duct 71 may be offset vehicle-widthwise inwardly from the inner side surface FW1 of the front wheel FW. Thus, the rear end 71B of the duct 71 is configured to allow an airflow ejected backward from the duct 71 to form a turbulence boundary layer T along the inner side surface FW1 of the front wheel FW. The turbulence boundary layer T is a boundary layer including a turbulent flow accompanied by vortex.

In the turbulence boundary layer T, a flow having a relatively high flow rate and a flow having a low flow rate in proximity of the inner side surface FW1 of the front wheel FW are mixed, causing active momentum exchange. This makes the turbulence boundary layer T more difficult to separate itself than a laminar boundary layer.

As illustrated in FIG. 2, in the duct 71, for example, a pair of plasma actuators 100i and 100o may be provided. Note that the plasma actuators 100i and 100o are also called plasma actuators 100.

The plasma actuators 100o and 100i, or the plasma actuators 100, may be provided on a pair of sidewalls in the vicinity of the rear end 71B of the duct 71. The pair of sidewalls are vehicle-widthwise opposed to each other.

The plasma actuator 100o may be provided on a vehicle-widthwise outer sidewall of the duct 71.

The plasma actuator 100i may be provided on a vehicle-widthwise inner sidewall of the duct 71.

The plasma actuators 100, or the plasma actuators 100o and 100i, are configured to generate airflows F, or airflows Fo and Fi, respectively. The plasma actuators 100, or the plasma actuators 100o and 100i, are configured to control strength of the airflows F, e.g., flow rates and amounts of flow.

In one embodiment of the disclosure, the plasma actuators 100, or the plasma actuators 100o and 100i, may serve as an "airflow deflector" and an "airflow accelerator".

Figure 3:
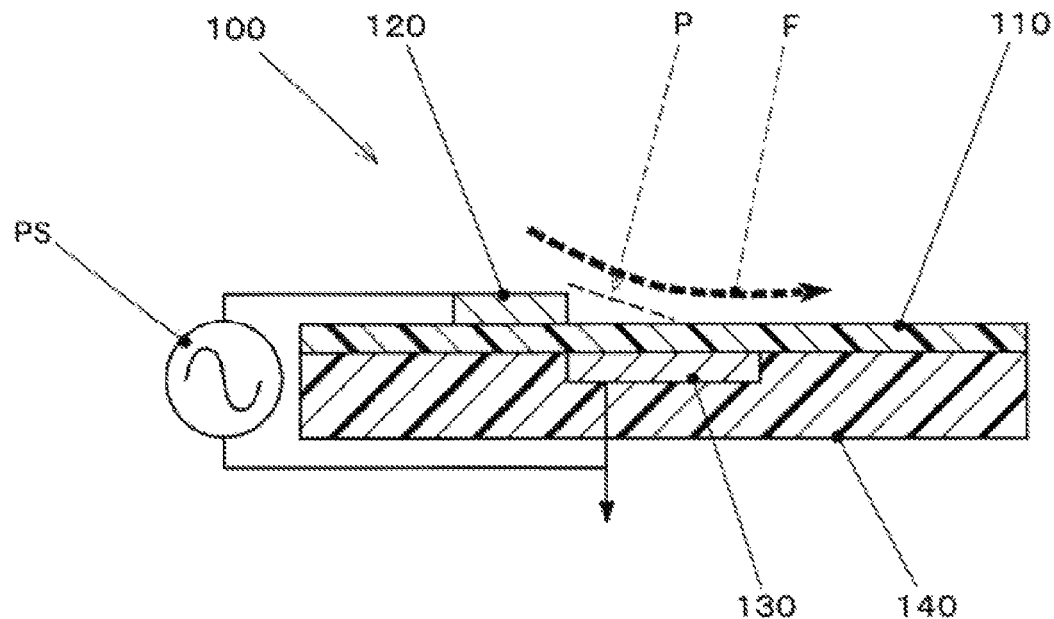
FIG. 3 is a schematic cross-sectional view of a bipolar plasma actuator to be provided in the airflow adjusting apparatus according to the first embodiment.

FIG. 3 is a schematic cross-sectional view of a bipolar plasma actuator to be provided in the airflow adjusting apparatus of the first embodiment.

The bipolar plasma actuators 100, or the plasma actuators 100o and 100i, may each include, without limitation, a dielectric 110, an upper electrode 120, a lower electrode 130, and an insulator 140.

The dielectric 110 may be a sheet-shaped member including, for example, a fluorocarbon resin such as polytetrafluoroethylene.

The upper electrode 120 and the lower electrode 130 may each include an electrically-conductive tape including a thin metal film of, for example, copper.

The upper electrode 120 may be attached to outer surface side of the dielectric 110. The outer surface side of the dielectric 110 refers to side exposed to the outside when the plasma actuator 100 is attached to, for example, the vehicle body.

The lower electrode 130 may be attached to inner surface side of the dielectric 110 that is opposite to the outer surface side of the dielectric 110.

The upper electrode 120 and the lower electrode 130 may be offset in an in-plane direction of the dielectric 110.

The insulator 140 may be a sheet-shaped member that serves as a base of the plasma actuator 100. The insulator 140 may be provided, on the inner surface side of the dielectric 110, to cover the lower electrode 130.

Allowing a power supply PS to apply an alternating voltage having a predetermined waveform to the upper electrode 120 and the lower electrode 130 of the plasma actuator 100 causes generation of a plasma discharge P between the electrodes.

It is necessary for the applied voltage to be high enough to cause electrical breakdown and generate the plasma discharge P. For example, the applied voltage may range from about 1 kV to about 10 kV.

A frequency of the applied voltage may range, for example, from about 1 kHz to about 10 kHz.

At this occasion, the air on the outer surface side of the plasma actuators 100 is drawn to the plasma discharges P, causing generation of the airflows F in a wall jet, i.e., the airflows Fo and Fi in FIG. 2.

Moreover, the plasma actuator 100 is configured to reverse a direction of the airflow F, by controlling the waveform of the alternating voltage to be applied.

The airflow adjusting apparatus of the first embodiment may include a control system described below, to supply driving electric power to the plasma actuators 100 described above, or the plasma actuators 100o and 100i, allowing the plasma actuators 100 to generate the airflows F, or the airflows Fo and Fi respectively, for airflow adjustment inside the wheel house H.

Figure 4:
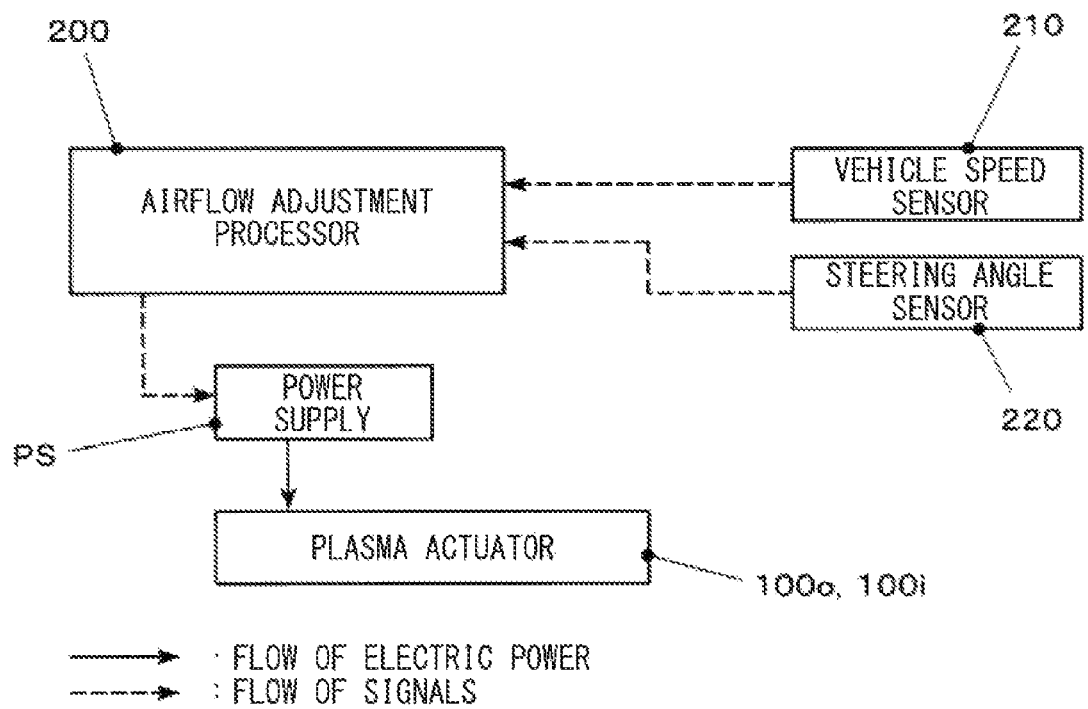
FIG. 4 is a block diagram illustrating a configuration of a control system of the plasma actuator in the airflow adjusting apparatus according to the first embodiment.

FIG. 4 is a block diagram illustrating a configuration of the control system of the plasma actuator in the airflow adjusting apparatus of the first embodiment.

The control system may include, without limitation, an airflow adjustment processor 200, a vehicle speed sensor 210, and a steering angle sensor 220.

The airflow adjustment processor 200 may control the power supply PS to control whether to operate or stop the plasma actuators 100o and 100i. In operating the plasma actuators 100o and 100i, the airflow adjustment processor 200 may control strength of the airflows F, e.g., amounts of flow and flow rates.

The airflow adjustment processor 200 may include, for example, a microcomputer including, without limitation, an information processor such as a CPU (Central Processing Unit), a storage such as a RAM (Random Access Memory) and/or a ROM (Read Only Memory), input and output interfaces, and a bus that couples them together.

The vehicle speed sensor 210 may detect a traveling speed of the vehicle 1, or a vehicle speed.

The vehicle speed sensor 210 may be provided in a hub bearing housing that rotatably holds the front wheel FW or an unillustrated rear wheel. The vehicle speed sensor 210 is configured to output a vehicle speed signal corresponding to a rotational speed of the wheel.

The steering angle sensor 220 may detect a steering angle of the front wheel FW.

The steering angle sensor 220 may be provided as, for example, a part of an unillustrated electric power steering device. The steering angle sensor 220 may include an angle encoder that detects an angle position of a steering shaft. The steering shaft may transmit rotation of a steering wheel to a steering gear box.

In the following, operation of the airflow adjusting apparatus of the first embodiment is described.

FIG. 2 illustrates the vehicle 1 on straight travel, with the steering angle of the front wheel FW being neutral.

In this state, the outer plasma actuator 100o and the inner plasma actuator 100i may generate and eject the airflows Fo and Fi backward of the vehicle, with the strength, or the flow rates, of the airflows Fo and Fi being equivalent.

The strength of the airflows Fo and Fi may be controlled to become greater in accordance with an increase in the vehicle speed.

In this way, a relative wind W having entered the duct 71 is ejected into cavity S inside the wheel house H, as a jet accelerated by the airflows Fo and Fi, to form the turbulence boundary layer T along the inner side surface FW1 of the front wheel FW.

In the meantime, a relative wind collides with the flap 90 or the front wheel FW under the vehicle body and separates itself into fragmental airflows. The fragmental airflows are drawn to the turbulence boundary layer T and follow the turbulence boundary layer T, to join an airflow moving centrally of the vehicle under the floor of the vehicle.

This suppresses the fragmental airflows from flowing vehicle-widthwise outward, or toward the outer side surface of the vehicle, or from colliding with the rear wheel.

Moreover, the plasma actuators 100o and 100i may cause the airflows Fo and Fi to be generated with different strength from each other. In other words, the plasma actuators 100o and 100i may cause a difference in the flow rates of the airflows Fo and Fi. This makes it possible to change substantially along a horizontal plane, or sway, a direction of an airflow to be ejected from the duct 71.

Figure 5:
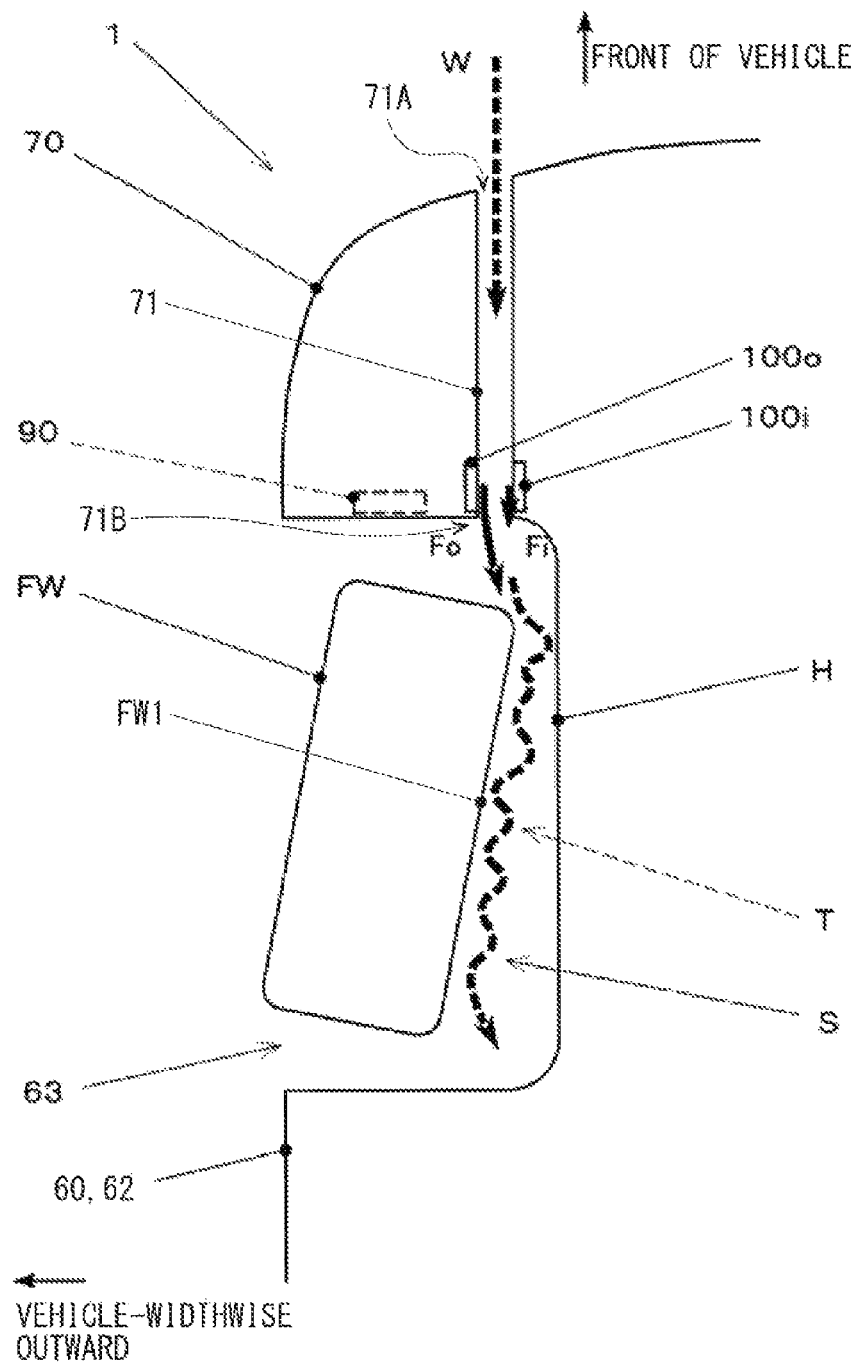
FIG. 5 schematically illustrates how an airflow moves inside a wheel house, with a front wheel steered toe-in, in the vehicle including the airflow adjusting apparatus according to the first embodiment.
Figure 6:
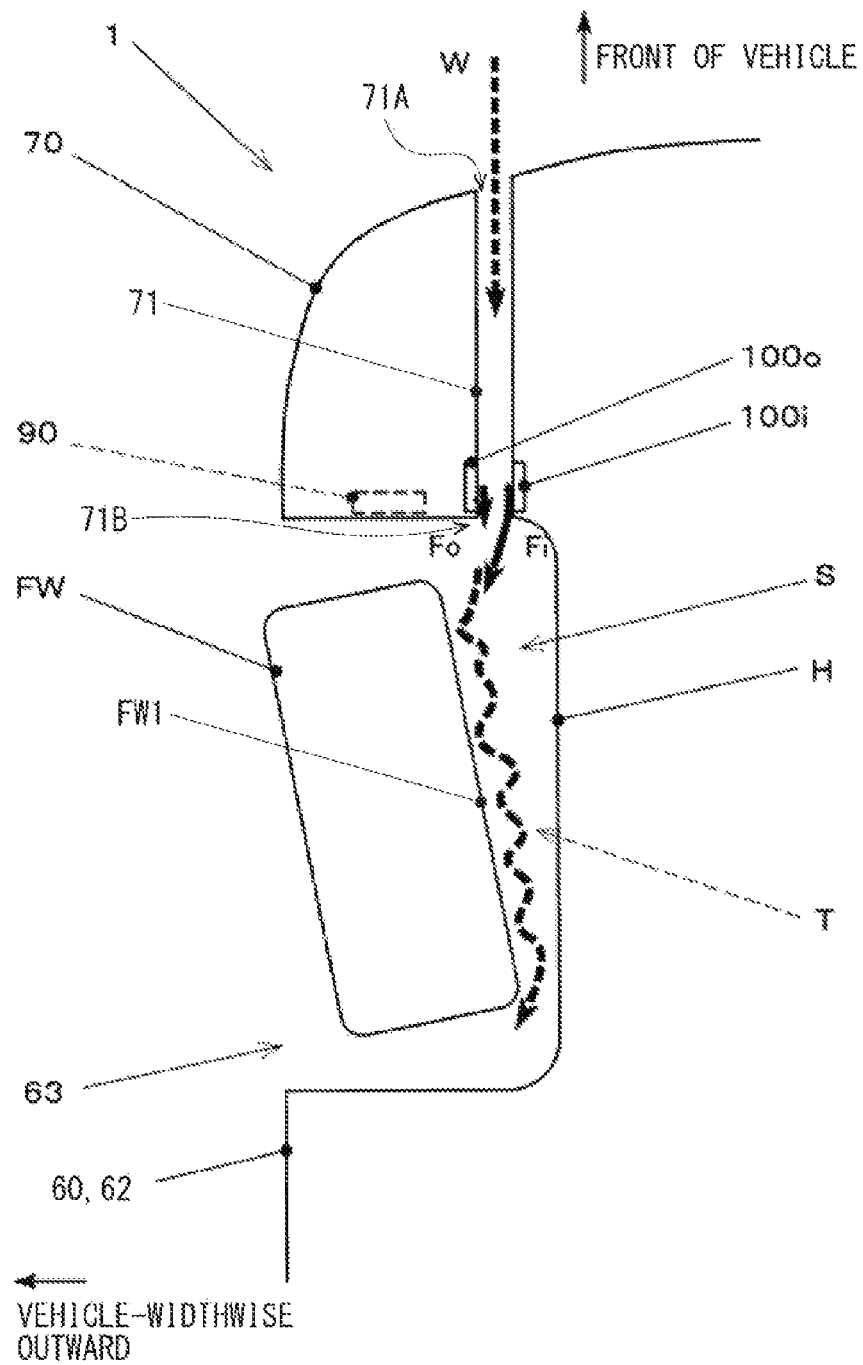
FIG. 6 schematically illustrates how an airflow moves inside the wheel house, with the front wheel steered toe-out, in the vehicle including the airflow adjusting apparatus according to the first embodiment.

FIGS. 5 and 6 schematically illustrate how an airflow moves inside the wheel house, with the front wheel steered toe-in and toe-out, respectively, in the vehicle including the airflow adjusting apparatus according to the first embodiment.

FIG. 5 illustrates, for example, the left front wheel FW of the vehicle 1 steered toe-in, or to the right.

In this case, the airflow adjustment processor 200 may make greater the strength of the airflow Fo to be generated by the outer plasma actuator 100o, than the strength of the airflow Fi to be generated by the inner plasma actuator 100i.

The airflows Fo and Fi are combined to form a composite airflow and the composite airflow is ejected into the cavity S inside the wheel house H. Because of the difference in the flow rates of the airflows Fo and Fi, the composite airflow is deflected vehicle-widthwise inward.

Hence, it is possible to form the turbulence boundary layer T appropriately along the inner side surface FW1 of the front wheel FW even in a case with a front end of the front wheel FW displaced vehicle-widthwise inward.

FIG. 6 illustrates, for example, the left front wheel FW of the vehicle 1 steered toe-out, or to the left.

In this case, the airflow adjustment processor 200 may make greater the strength of the airflow Fi to be generated by the inner plasma actuator 100i, than the strength of the airflow Fo to be generated by the outer plasma actuator 100o.

The airflows Fo and Fi are combined to form the composite airflow and the composite airflow is ejected into the cavity S inside the wheel house H. Because of the difference in the flow rates of the airflows Fo and Fi, the composite airflow is deflected vehicle-widthwise outward.

Hence, it is possible to form the turbulence boundary layer T appropriately along the inner side surface FW1 of the front wheel FW even in a case with the front end of the front wheel FW displaced vehicle-widthwise outward.

As described, in the first embodiment, it is possible to produce the following effects.

(1) With the use of the duct 71 and the plasma actuators 100, or the plasma actuators 100o and 100i, the turbulence boundary layer T is formed. The turbulence boundary layer T is adjacent to the vehicle-widthwise inner side surface FW1 of the front wheel FW. The relative wind W collides with the front wheel FW or other components adjacent to the front wheel FW, e.g., the flap 90, and separates itself into fragmental airflows. Forming the turbulence boundary layer T makes it possible to allow the fragmental airflows to follow the turbulence boundary layer T and join the airflow moving centrally of the vehicle under the floor of the vehicle. Hence, it is possible to suppress the fragmental airflows from being discharged toward the side surface 62 of the fender 60.

This leads to suppression of air resistance of the vehicle 1 and improvement of operation stability.

Moreover, it is possible to prevent the fragmental airflows from colliding with the rear wheel or components around the rear wheel. This also leads to the suppression of air resistance of the vehicle 1, and furthermore, suppression of aerodynamic noise and aerodynamic vibration around the rear wheel.

(2) With the use of the difference in the flow rates of the airflows Fo and Fi to be generated by the plasma actuators 100o and 100i, the composite airflow may be deflected in accordance with the steering of the front wheel FW. This makes it possible to form the turbulence boundary layer T reliably in the vicinity of the inner side surface FW1 of the front wheel FW, even in a case with changes in positional relation of the front wheel FW and an outlet, i.e., the rear end 71B, of the duct 71 because of the steering of the front wheel FW, or a change in a toe direction. Hence, it is possible to produce the effects described above.

(3) The duct 71 may be provided to introduce the relative wind W into the cavity S inside the wheel house H through the inlet in the front surface of the bumper 70. This makes it possible to generate effectively the composite airflow that forms the turbulence boundary layer T, with the use of dynamic pressure of the relative wind W. The relative wind W is an airflow moving relative to the vehicle body from the front side of the vehicle to the rear side of the vehicle while the vehicle is traveling.

(4) The airflow accelerator, e.g., the plasma actuators 100o and 100i, may further accelerate the airflow flowing inside the duct 71, or the relative wind. This makes it possible to enhance a flow rate of turbulence of the turbulence boundary layer T. Hence, it is possible to promote the effects described above.

(5) The airflows Fo and Fi that accelerate and deflect the relative wind W may be generated with the use of the plasma actuators 100o and 100i. Thanks to the simple configuration of the plasma actuators 100o and 100i devoid of movable components, it is possible to generate the airflows Fo and Fi with high responsiveness.

Second Embodiment

Description now moves on to an airflow adjusting apparatus according to a second embodiment of the disclosure.

The following description is given mainly of differences from the forgoing first embodiment. Constituent elements common to those of the forgoing first embodiment are denoted by the same reference characters, and description thereof is omitted.

Figure 7:
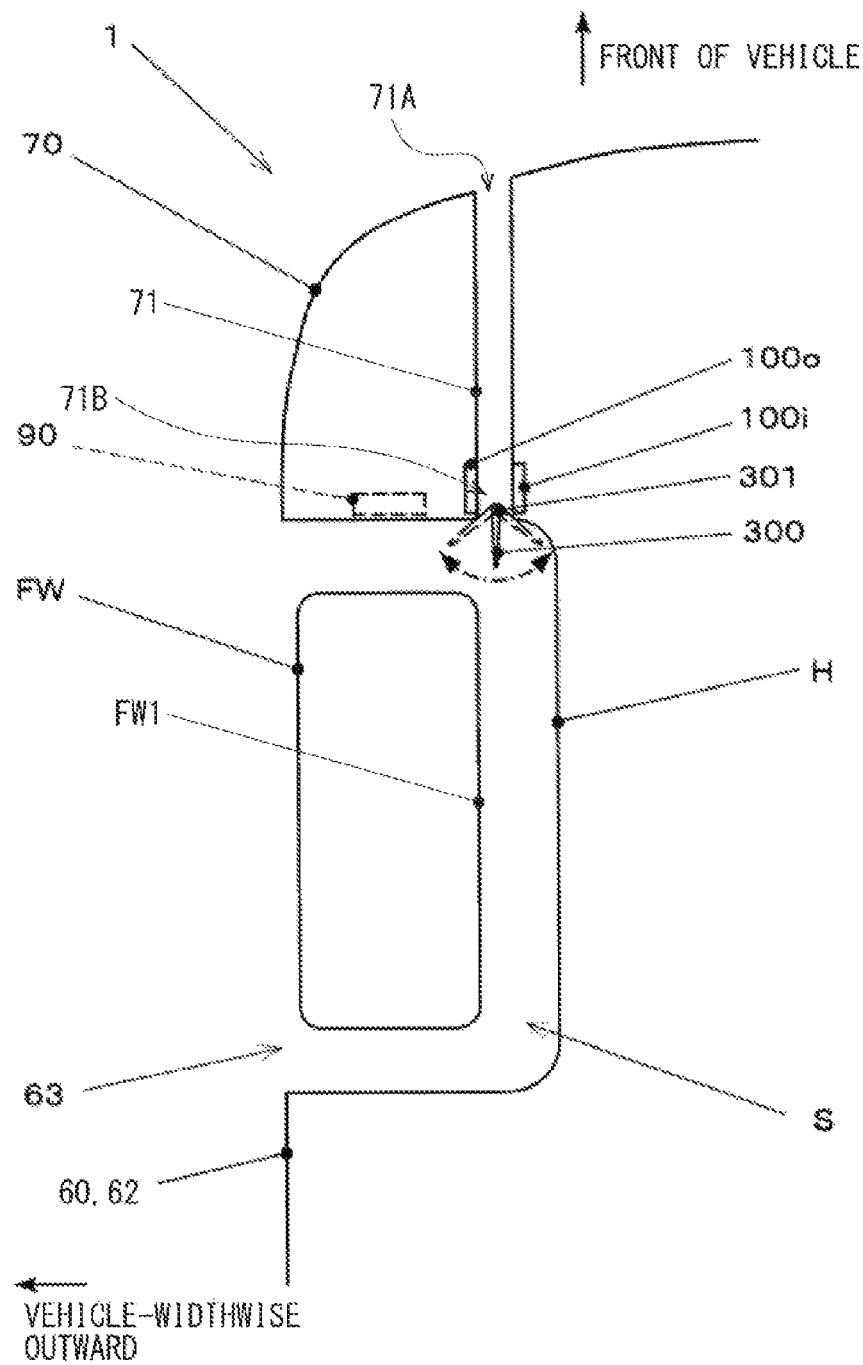
FIG. 7 schematically illustrates the vicinity of a wheel house of a vehicle including an airflow adjusting apparatus according to a second embodiment of the disclosure.

FIG. 7 schematically illustrates the vicinity of a wheel house of a vehicle including an airflow adjusting apparatus according to the second embodiment. Note that FIG. 7 is equivalent to FIG. 2 in the first embodiment.

The airflow adjusting apparatus of the second embodiment may include a movable louver 300. The movable louver 300 is provided at the outlet, or the rear end 71B, of the duct 71. The movable louver is configured to deflect a direction of the airflow to be ejected from the duct 71.

The movable louver 300 may include, for example, a flap of a flat plate shape substantially along a vertical direction and the vehicle longitudinal direction, in a state in which the vehicle 1 is on straight travel.

The movable louver 300 may be driven by an unillustrated actuator to rotate, or sway, around a rotation axis 301. The rotation axis 301 may be provided at a front end of the movable louver 300 and extend in the vertical direction.

The movable louver 300 may turn in accordance with the steering angle of the front wheel FW, to cause the turbulence boundary layer T to be formed along the inner side surface FW1 of the front wheel FW. The steering angle of the front wheel FW is detected by the steering angle sensor 220.

As described, in the second embodiment, it is possible to enhance controllability of the direction of the airflow to be ejected to inside the wheel house H from the duct 71. Hence, it is possible to obtain more reliably the airflow adjustment effects in a steered state.

Modification Examples

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.
(1) The configurations of the vehicle and the airflow adjusting apparatus are not limited to the forgoing embodiments, but may be changed as appropriate.

For example, a vehicle type and a vehicle model of the vehicle are not limited to the forgoing embodiments, but may be changed as appropriate.
(2) The arrangement and the number of the plasma actuators in the forgoing embodiments are merely exemplary, and may be changed as appropriate.
(3) In the forgoing embodiments, the airflows that forms the turbulence boundary layer is generated with the use of the plasma actuators. However, the airflow generation may be carried out by other methods than the use of the plasma actuators.

For example, other devices such as a blower fan may be used to generate the airflows.

The configuration of the plasma actuator is not limited to those of the forgoing embodiments, but may be changed as appropriate.

For example, in the forgoing embodiments, the bipolar plasma actuator is adopted, but a three-pole plasma actuator may be also adopted. The three-pole plasma actuator includes a plurality of electrode pairs.

Furthermore, there is no particular limitation on a device that deflects the airflow.
(4) In the forgoing embodiments, the alternating voltage is applied between the electrodes of the plasma actuator. However, in an alternative configuration, a DC voltage may be applied. For example, a DC voltage may be pulsed at a predetermined frequency. In the case with the DC voltage application, polarity may be switchable, to control a direction of the generation of the airflow.

In a case with the use of the three-pole plasma actuator, an alternating voltage may be applied to both electrode pairs, or alternatively, a DC voltage may be applied to both electrode pairs. In another alternative, an alternating voltage may be applied to one electrode pair, while a DC voltage may be applied to the other electrode pair.

As described, according to the aspects of the technology, it is possible to provide an airflow adjusting apparatus that makes it possible to adjust appropriately fragmental airflows generated by collision of relative winds with a wheel.

The airflow adjustment processor 200 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airflow adjustment processor 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airflow adjustment processor 200 illustrated in FIG. 4.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An airflow adjusting apparatus to be provided in a vehicle, the vehicle including a wheel and a wheel housing including a cavity that is opened downward and laterally outward of a vehicle body of the vehicle, and houses a portion of the wheel, the airflow adjusting apparatus comprising:
    an airflow ejector provided, in the cavity, on a front side of the vehicle relative to the wheel, and configured to eject an airflow that forms a turbulence boundary layer adjacent to a surface of the wheel on a vehicle-widthwise inner side,
    wherein the airflow ejector includes an airflow deflector configured to deflect a direction of ejection of the airflow in accordance with steering of the wheel.

2. The airflow adjusting apparatus according to claim 1, wherein the airflow ejector includes a duct including an inlet provided on the front side of the vehicle relative to the wheel, the duct being configured to introduce a relative wind into the cavity through the inlet.

3. The airflow adjusting apparatus according to claim 2, wherein the airflow ejector includes an airflow accelerator provided in the duct and configured to accelerate an airflow passing through an inside of the duct.

4. The airflow adjusting apparatus according to claim 3, wherein the airflow accelerator includes a plasma actuator including:
    at least one pair of electrodes disposed with a dielectric in between; and
    a power supply configured to apply a voltage to the at least one pair of the electrodes.

5. An airflow adjusting apparatus to be provided in a vehicle, the vehicle including a wheel and a wheel housing including a cavity that is opened downward and laterally outward of a vehicle body of the vehicle, and houses a portion of the wheel, the airflow adjusting apparatus comprising:

an airflow ejector provided, in the cavity, on a front side of the vehicle relative to the wheel, and configured to eject an airflow that forms a turbulence boundary layer adjacent to a surface of the wheel on a vehicle-widthwise inner side, wherein the airflow ejector includes a duct including an inlet provided on the front side of the vehicle relative to the wheel, the duct being configured to introduce a relative wind into the cavity through the inlet, wherein the airflow ejector includes an airflow accelerator provided in the duct and configured to accelerate an airflow passing through an inside of the duct, wherein the airflow accelerator includes a plasma actuator including:

at least one pair of electrodes disposed with a dielectric in between; and a power supply configured to apply a voltage to the at least one pair of the electrodes.

* * * * *